(12) United States Patent
Yang et al.

(10) Patent No.: US 10,166,719 B1
(45) Date of Patent: Jan. 1, 2019

(54) PRINT PROTECTION METHOD AND THREE-DIMENSIONAL PRINTING APPARATUS

(71) Applicants: XYZprinting, Inc., New Taipei (TW); Kinpo Electronics, Inc., New Taipei (TW)

(72) Inventors: Yu-Jie Yang, New Taipei (TW); Chung-Chih Yang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/865,290

(22) Filed: Jan. 9, 2018

(30) Foreign Application Priority Data

Oct. 30, 2017 (CN) .......................... 2017 1 1029818

(51) Int. Cl.
| | |
|---|---|
| B33Y 10/00 | (2015.01) |
| B33Y 30/00 | (2015.01) |
| B33Y 40/00 | (2015.01) |
| B33Y 50/02 | (2015.01) |
| B29C 64/393 | (2017.01) |
| B29C 64/112 | (2017.01) |
| B29C 64/227 | (2017.01) |

(52) U.S. Cl.
CPC .......... B29C 64/393 (2017.08); B29C 64/112 (2017.08); B29C 64/227 (2017.08); *B33Y 10/00* (2014.12); *B33Y 50/02* (2014.12)

(58) Field of Classification Search
CPC ... B29C 64/112; B29C 64/393; B29C 64/227; B33Y 10/00; B33Y 50/02; B41J 2/045; B41J 2/0451; B41J 2/0457; B41J 2/04548

USPC .......................................................... 347/14
See application file for complete search history.

(56) References Cited

U.S. PATENT DOCUMENTS

| | | | | |
|---|---|---|---|---|
| 4,573,058 | A * | 2/1986 | Brooks | B41J 2/355 219/497 |
| 2003/0142159 | A1* | 7/2003 | Askeland | B41J 2/04528 347/14 |
| 2004/0003738 | A1* | 1/2004 | Imiolek | B22F 3/1055 101/480 |
| 2014/0320559 | A1* | 10/2014 | Bruno | B41J 2/04501 347/9 |
| 2017/0305150 | A1* | 10/2017 | Gardner | B41J 2/04548 |

* cited by examiner

*Primary Examiner* — Huan Tran
*Assistant Examiner* — Alexander D Shenderov
(74) *Attorney, Agent, or Firm* — JCIPRNET

(57) ABSTRACT

A print protection method adapting to a three-dimensional printing apparatus is provided. The print protection method includes following step: when a system voltage reduces from a normal voltage to a first threshold voltage, and lower than the first threshold voltage, generating a triggering signal to a control device by the trigger circuit; recording a position data of a current position of a print head to a storage device by the control device according to the triggering signal after the system voltage is lower than the first threshold voltage; and completely shutting down a peripheral device and the print head by the control device according to the triggering signal after the system voltage is lower than the second threshold voltage, so that the control device is continuously operated by remaining power after the system voltage is lower than the second threshold voltage. In addition, the above three-dimensional printing device is also provided.

16 Claims, 3 Drawing Sheets

PRINT PROTECTION METHOD AND THREE-DIMENSIONAL PRINTING APPARATUS

CROSS-REFERENCE TO RELATED APPLICATION

This application claims the priority benefit of China application serial no. 201711029818.6, filed on Oct. 30, 2017. The entirety of the above-mentioned patent applications is hereby incorporated by reference herein and made a part of this specification.

BACKGROUND

Technical Field

The invention is related a printing technology, and particularly to a print protection method and a three-dimensional printing apparatus.

Related Art

Along with progress of computer-aided manufacturing (CAM), three-dimensional (3D) printing technology is developed by manufacturing industry to rapidly convert original design concept into physical models. The 3D printing technology is actually a general designation of a series of rapid prototyping (RP) techniques, and a basic principle thereof is additive manufacturing on a printing platform where a RP machine is used to form a plurality of layer objects on the printing platform in an X-Y plane through scanning so that the layer objects are stacked to form a 3D object.

Generally speaking, in the process where a 3D printing apparatus performs printing operation, if sudden-power-off (city power off or suspended due to human factor) is occurred, the 3D printing apparatus would stop operating. However, since the internal circuit element in the general 3D printing apparatus does not stop working after interruption of power supply, a control device and a motor device and the like of the 3D printing apparatus still continue to work for a period time by remaining power in the 3D printing apparatus after the power is off. That is to say, the position data of a print head marked by the 3D printing apparatus after power is off is likely to be discrepant to the final position where the print head stops, which causes that the 3D printing apparatus cannot accurately resume the previous printing operation after the power is restored, and a printing error is generated in the 3D object that is to be printed continuously. In view of the above, when sudden-power-off is occurred to the 3D printing apparatus, one of the important issues is to figure out how to make the 3D printing apparatus to accurately record the position of the printing head so that the 3D printing apparatus can accurately continue the previous printing operation after the power is restored.

SUMMARY

The exemplary embodiment provides a print protection method and a three-dimensional (3D) printing apparatus. When sudden-power-off is occurred, the 3D printing apparatus is capable of shutting down the operation of all peripheral apparatuses so that a control device is operated continuously by sufficient remaining power, and the control device records the position of a print head in advance so that the 3D printing apparatus can accurately continue the previous printing operation after the power is restored.

A print protection method provided by the exemplary embodiment is adapted to a 3D printing apparatus. The 3D printing apparatus includes a trigger circuit, a control device, a peripheral device, a print head and a storage device. The print protection method includes the following steps: when a system voltage of the 3D printing apparatus is reduced from a normal voltage to a first threshold voltage and lower than the first threshold voltage, generating a triggering signal to the control device by the trigger circuit; recording a position data of a current position of the print head into the storage device by the control device according to the triggering signal after the system voltage is lower than the first threshold voltage; and completely shutting down operation of the peripheral device and the print head by the control device according to the triggering signal after the system voltage is lower than the second threshold voltage, so that the control device is continuously operated by remaining power after the system voltage is lower than the second threshold voltage, wherein the second threshold voltage is lower than the first threshold voltage.

In the exemplary embodiment, a 3D printing apparatus includes a control device, a trigger circuit, a peripheral device, a print head and a storage device. The trigger circuit is coupled to the control device. When a system voltage is reduced from a normal voltage to a first threshold voltage and lower than the first threshold voltage, the trigger circuit generates a triggering signal to the control device. The peripheral device is coupled to the control device. The print head is coupled to the control device. The storage device is coupled to the control device. The control device records a position data of a current position of the print head into the storage device according to the triggering signal after the system voltage is lower than the first threshold voltage. The control device completely shuts down the operation of the peripheral device and the print head according to the triggering signal after the system voltage is reduced to the second threshold voltage, so that the control device is continuously operated by remaining power after the system voltage is lower than the second threshold voltage. The second threshold voltage is lower than the first threshold voltage.

According to the above exemplary embodiments, the print protection method and the 3D printing apparatus can accurately determine whether there is interruption of power supply in the process where the 3D printing apparatus performs 3D printing operation, and may shut down the operation of all peripheral devices, so that the control device can be continuously operated by sufficient remaining power and effectively record the final position of the print head. As a result, when power supply for the 3D printing apparatus is restored, the 3D printing apparatus can accurately continue performing the 3D printing operation.

In order to make the aforementioned and other features and advantages comprehensible, several exemplary embodiments accompanied with figures are described in detail below.

BRIEF DESCRIPTION OF THE DRAWINGS

The accompanying drawings are included to provide a further understanding of the exemplary embodiments, and are incorporated in and constitute a part of this specification. The drawings illustrate embodiments and, together with the description, serve to explain the principles of the exemplary embodiment.

DETAILED DESCRIPTION OF DISCLOSED EMBODIMENTS

Figure 1:
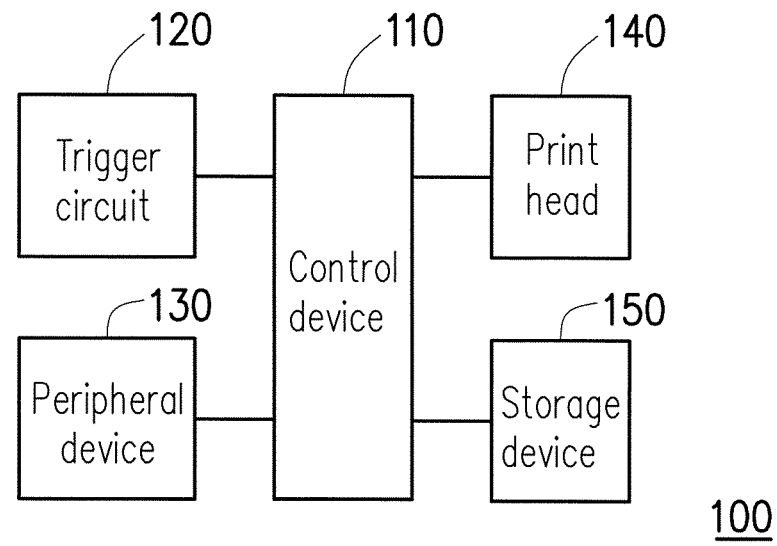
FIG. 1 is a block diagram of a three-dimensional (3D) printing apparatus according to an exemplary embodiment.

In order to make the invention more comprehensible, embodiments are described below as the examples to prove that the invention can actually be realized. In addition, wherever possible, elements/components/steps denoted by the same reference numerals in drawings and embodiments represent the same or similar parts.

FIG. 1 is a block diagram of a three-dimensional (3D) printing apparatus according to an exemplary embodiment. Referring to FIG. 1, a 3D printing apparatus 100 includes a control device 110, a trigger circuit 120, a peripheral device 130, a print head 140 and a storage device 150. The control device 110 is coupled to the trigger circuit 120, the peripheral device 130, the print head 140 and the storage device 150. The 3D printing apparatus 100 is adapted to perform 3D printing operation. In the exemplary embodiment, the control device 110 is configured to control the print head 140 and the peripheral device 130 to perform the 3D printing operation. The peripheral device 130 may include, for example, a motor device, a heating device, a fan device or a laser device and so on. Moreover, the 3D printing apparatus 100 may further include, for example, other components used for performing 3D printing operation such as a printing platform, a feeding line or a linking mechanism of the print head. Sufficient teaching, suggestions and implementation regarding the related components can be derived from ordinary knowledge of the field, and thus no further descriptions are incorporated herein.

In the exemplary embodiment, the 3D printing operation refers to that the control device 110 controls a moving path of the print head 140 according to a plurality of layer data of a 3D model, and operates the print head 140 to print at least one layer object on a carrying surface of the printing platform. The 3D printing apparatus 100 can print a plurality of layer objects in sequence so that the layer objects are stacked to be modelled into a 3D object on the carrying surface of the printing platform. In the exemplary embodiment, the layer data may be, for example, a two-dimensional pattern file, and includes a plurality of position data, wherein the position data may include parameters related to moving the print head such as a G-code. In the exemplary embodiment, the control device 110 controls the print head 140 according to the position data among the layer data to move the print head 140 to a corresponding position to perform feeding operation.

In the exemplary embodiment, the control device 110 may include a processing chip or, for example, a central processing unit (CPU), or a programmable general purpose or special purpose microprocessor, a digital signal processor (DSP), a programmable controller, an application specific integrated credits (ASIC), a programmable logic device (PLD), other similar processing circuit or a combination thereof.

In the exemplary embodiment, the storage device 150 may be, for example, an electrically-erasable programmable read-only memory (EEPROM), an embedded multi media card (eMMC), a dynamic random access memory (DRAM), a flash memory or a non-volatile random access memory (NVRAM) and so on. In the exemplary embodiment, the storage device 150 may be configured to store position data and parameters described in the exemplary embodiments, and further store a plurality of calculating, processing or computing modules to be provided to the control device 110 to read and perform, so that the control device 110 can realize the print protection operation described in the exemplary embodiments.

Figure 2:
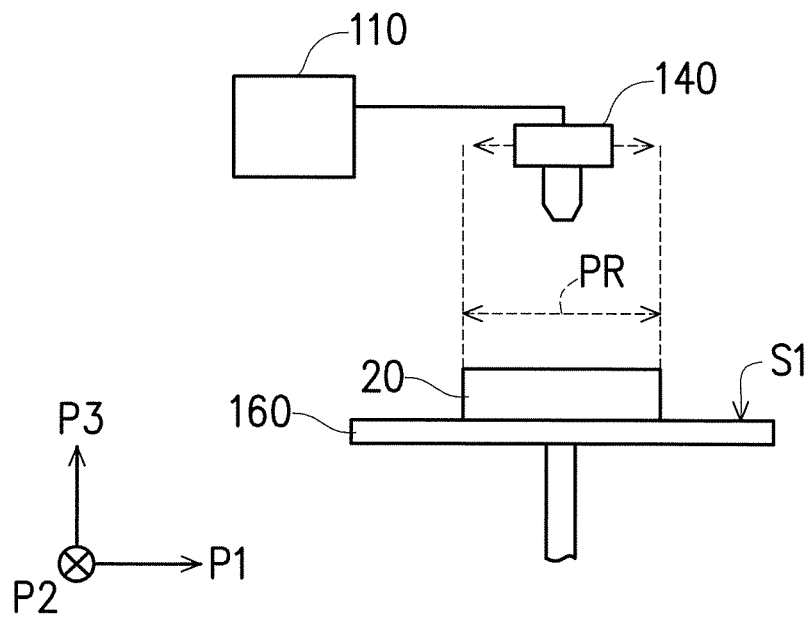
FIG. 2 is a schematic view of the 3D printing apparatus according to the exemplary embodiment of FIG. 1.

FIG. 2 is a schematic view of the 3D printing apparatus according to the exemplary embodiment of FIG. 1. Referring to FIG. 1 and FIG. 2, the control device 110 of the 3D printing apparatus 100 can control the print head 140 to perform printing operation on a carrying surface S1 of the printing platform 160, and print a 3D object 20 within a printing range PR. The carrying surface S1 of the printing platform 160 is a plane (horizontal plane) formed in a first direction P1 and a second direction P2, and the print head 140 may be moved in the first direction P1, the second direction P2 or a third direction P3 (vertical direction), which should not be construed as a limitation to the invention. The first direction P1, the second direction P2 and the third direction P3 are perpendicular to each other.

In the exemplary embodiment, the 3D printing apparatus 100 has a print protection mechanism. When the 3D printing apparatus 100 performs printing operation, if sudden-power-off is occurred, the control device 110 can record the position data of the print head 140 in advance when sudden-power-off is occurred. As a result, after the power supply for the 3D printing apparatus is restored, the print head 140 can be accurately moved to the position previously located when the sudden-power-off is occurred to continue the printing operation accurately. Moreover, in an exemplary embodiment, when the 3D printing apparatus 100 performs the printing operation, if sudden-power-off is occurred, the control device 110 can simultaneously shut down feeding operation of the print head 140 or move the print head 140 out of the printing range PR to effectively protect the 3D object 20 and reduce printing error.

Figure 3:
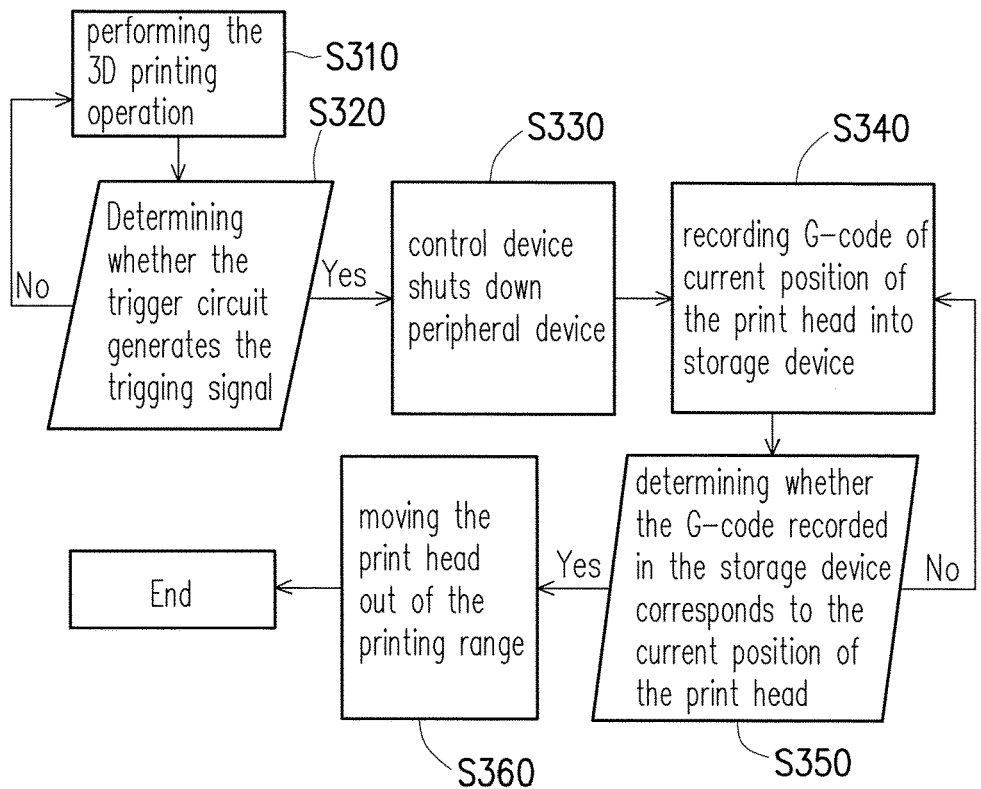
FIG. 3 is a schematic view of a print protection method according to an exemplary embodiment.

FIG. 3 is a schematic view of a print protection method according to an exemplary embodiment. Referring to FIG. 1 to FIG. 3, the print protection method in FIG. 3 is adapted to the 3D printing apparatus 100 described in the exemplary embodiments of FIG. 1 and FIG. 2. In the exemplary embodiment, the print protection mechanism of the 3D printing apparatus 100 may be, for example, implementation of the steps described in FIG. 3. In step S310, the 3D printing apparatus 100 performs a 3D printing operation. In step S320, the control device 110 determines whether the trigger circuit 120 generates the triggering signal. If the determination result is negative, the control device 110 determines that the power supply for the 3D printing apparatus 100 is normal, and performs step S310 to continuously perform the 3D printing operation. If the determination result is affirmative, the control device 110 determines that power-off is occurred on the 3D printing apparatus 100 and performs step S330.

In step S330, before the 3D printing apparatus 100 runs out of power, the control device 110 can shut down (or disable) the peripheral device 130 via a switching element or a switching circuit to reduce power attenuation of the 3D printing apparatus 100. In the exemplary embodiment, the peripheral device 130 may be a motor device, a heating device, a fan device or a laser device and the like that consume more energy. In step S340, the control device 110 records the position data (G-code) of the current position of the print head 140 into the storage device 150. In other words, when power-off is occurred on the 3D printing apparatus 100, the 3D printing apparatus 100 in the exemplary embodiment can effectively retain remaining power for the control device 110 to record the position of the print head 140, so that the 3D printing apparatus 100 can accurately continue the 3D printing operation after power supply is restored.

In step S350, the control device 110 can determine whether the G-code in the storage device 150 corresponds to the current position of the print head 140. If the determination result is negative, the control device 110 performs step S340 again to re-record the position data of the current position of the print head 140 into the storage device 150. If the determination result is affirmative, the control device 150 performs step S360. In step S360, the control device 150 moves the print head 140 out of the printing range PR to avoid that extra printing material of the print head 140 is accumulated on the 3D object 20. In other words, when power-off is occurred on the 3D printing apparatus 100, the 3D printing apparatus 100 in the exemplary embodiment not only can immediately record the position of the print head 140, but also can move the print head 140 out of the printing range PR in advance to avoid printing error and reduce printing discrepancy of print object.

Figure 4:
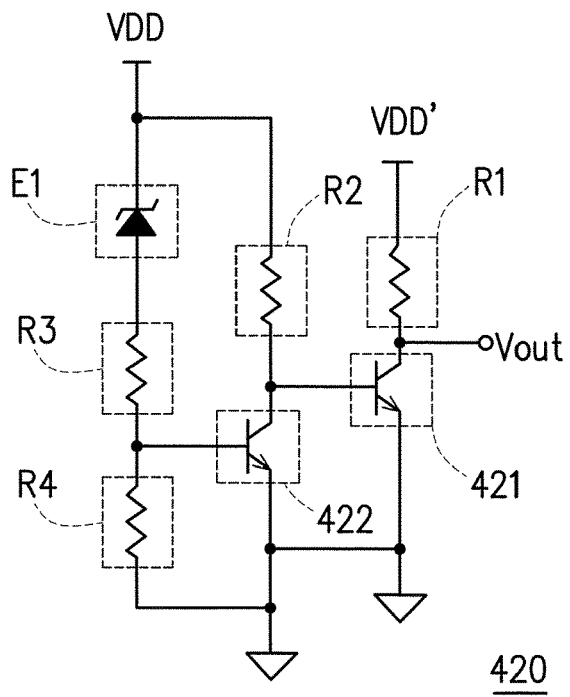
FIG. 4 is a circuit diagram of a trigger circuit according to an exemplary embodiment.

FIG. 4 is a circuit diagram of a trigger circuit according to an exemplary embodiment. Referring to FIG. 4, the trigger circuit in the exemplary embodiments may be a trigger circuit 420 illustrated in FIG. 4. However, FIG. 4 merely serves to exemplify a realization of the trigger circuit of the invention, which should not be construed as a limitation to the invention. In the exemplary embodiment, the trigger circuit 420 may include two switch transistors 421, 422, resistances R1-R4 and a Zener diode E1. The switching transistors 421 and 422 are, for example, a metal-oxide-semiconductor field-effect (NMOS) transistor or a bipolar junction transistor (BJT) transistor. The switching transistor 421 is coupled to the switching transistor 422, and voltage sources VDD and VDD' may be configured to provide divided voltage to the switching transistors 421 and 422 via the resistances R1-R4 and the Zener diode E1.

In the exemplary embodiment, the voltage source VDD may be, for example, a system voltage of the 3D printing apparatus, and the voltage source VDD' may be, for example, an operation voltage of the control device or the storage device. When the system voltage of the 3D printing apparatus becomes abnormal and begins to attenuate, and lower than a predetermined threshold voltage, a voltage output end Vout of the switching transistor 421 may output a triggering signal to the control device. In other words, the control device in the exemplary embodiments can determine whether power-off is occurred on the 3D printing apparatus according to whether the triggering signal generated by the trigger circuit 420 is received. However, in the exemplary embodiment, sufficient teaching, suggestions and implementation regarding the detailed operation and element parameters of the switching transistors 421, 422, resistances R1-R4 and the Zener diode E1 can be derived from ordinary knowledge known to persons skilled in the art, and thus no further descriptions are incorporated herein.

Figure 5:
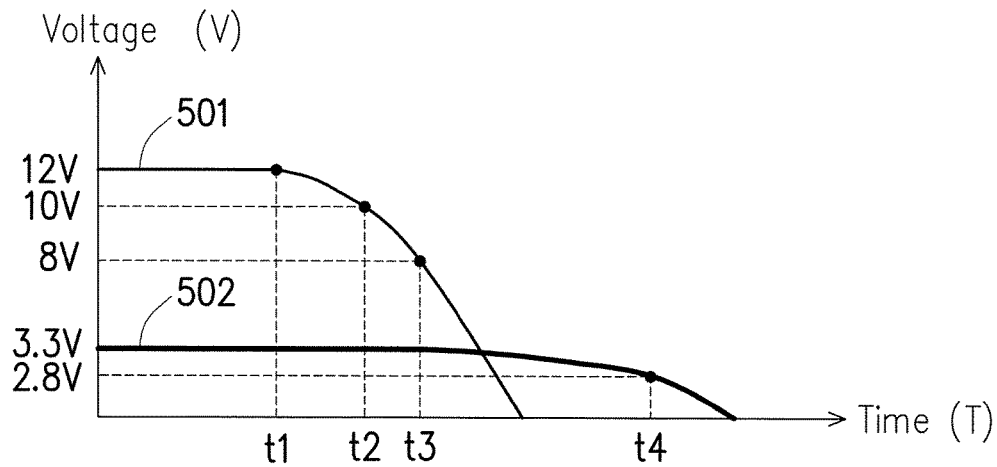
FIG. 5 is a diagram illustrating change of a system voltage and an operation voltage according to an exemplary embodiment.

FIG. 5 is a schematic view illustrating change of a system voltage and an operation voltage according to an exemplary embodiment. Referring to FIG. 1, FIG. 2 and FIG. 5, the horizontal axis in FIG. 5 represents time (T), and the vertical axis represents voltage (V). In the exemplary embodiment, when the 3D printing apparatus 100 performs 3D printing operation, the normal voltage of a system voltage 501 of the 3D printing apparatus 100 may be, for example, 12V (volt), and the normal voltage of an operation voltage 502 of the control device 110 and the storage device 150 may be, for example, 3.3V (first voltage). In the exemplary embodiment, when power-off is occurred on the 3D printing apparatus 100, the system voltage 501 begins to attenuate at a time point t1. When the system voltage 501 is attenuated to a first threshold voltage, the trigger circuit 120 generates the triggering signal at a time point t2, wherein the first threshold voltage is 10V. That is to say, to avoid that the control device 110 makes an erroneous judgment, the 3D printing apparatus 100 in the exemplary embodiment may be designed in the manner that the trigger circuit 120 generates the triggering signal only when the system voltage 501 is reduced to 10V.

In the exemplary embodiment, at the time point t2, the operation voltage 502 of the control device 110 and the storage device 150 are not attenuated yet. The control device 110 shuts down the peripheral device 130 according to the triggering signal, and shuts down the printing operation. The control device 110 records the position data of the current position of the print head 140 into the storage device 150. In the exemplary embodiment, the minimum operation voltage of the control device 110 and the storage device 150 is, for example, 2.8V (second voltage). In other words, if the voltage received by the control device 110 and the storage device 150 is lower than the minimum operation voltage, the control device 110 and the storage device 150 cannot perform recording operation. Therefore, in the time period from time point t2 to t4, the control device 110 records the position data of the print head 140 into the storage device 150. In the embodiment, the time period from time point t2 to t4 is counted from a time point at which the system voltage 501 is lower than the first threshold voltage (10V) to a time point at which the operation voltage 502 of the storage device 150 is reduced from the normal voltage (3.3V) to the minimum operation voltage (2.8V). Furthermore, in an embodiment, a time length of the period of time point t2 to t4 may be, for example, 20 ms (millisecond).

In the exemplary embodiment, the operation voltage 502 of the control device 110 and the storage device 150 begins to attenuate at a time point t3. Therefore, in the time period from time point t2 to t3, the control device 110 shuts down the peripheral device 130 that consumes more energy to reduce the attenuation of the remaining power of the 3D printing apparatus 100. In the exemplary embodiment, the time period from time point t2 to t3 refers to a time period during which the system voltage 501 is reduced from the first threshold voltage (10V) to the second threshold voltage (8V).

In an exemplary embodiment, in a time period from time point t2 to t4, the control device 110 may also check whether the position data of the print head 140 stored in the storage device 150 is correct. If the control device 110 determines that the position data does not correspond to the current position (movement of print head is not stopped yet) of the print head 140, the control device 110 re-records the position data of the current position of the print head 140 into the storage device 150. Also, in an exemplary embodiment, in a time period from time point t2 to t3, the control device 110 may shut down the feeding operation of the print head 140, and calculates the remaining power of the 3D printing apparatus 100 as well as the shortest path (or path) along which the print head 140 is moved away from the printing range. In other words, the control device 110 shuts down the peripheral device 130 but does not completely shut down the print head 140. As a result, the control device 110 can determine whether the time period from time point t2 to t3 is sufficient to drive the print head 140 to move out of the printing range PR according to the remaining power and the shortest path.

That is to say, if the remaining power is sufficient, the control device 110 drives the print head 140 to move out of the printing range PR. IF the remaining power is insufficient, the control device 110 drives the print head 140 to perform wire withdrawing operation to avoid that extra wire in the print head 140 to be erroneously printed on the 3D object 20, or that the extra wire in the print head 140 falls on the 3D object 20. More specifically, the control device 110 can calculate the closest distance from the print head 140 to the boundary of the printing range PR in the first direction (e.g., X-axis) or the second direction P2 (e.g., Y-axis), and determines a shortest path according to the calculation result. The shortest path is, for example, facing the second direction P2. Therefore, the control device 110 may provide a minimum enabling voltage to a portion of driving element of the motor device to drive the print head 140 to move away from the printing range PR (moving along a single axis) in the second direction P2. Accordingly, when the power supply for the 3D printing apparatus 100 is restored, the control device 110 can read the position data stored in the storage device 150, and drive the print head 140 to restore to the previous printing position accurately according to the position data.

Figure 6:
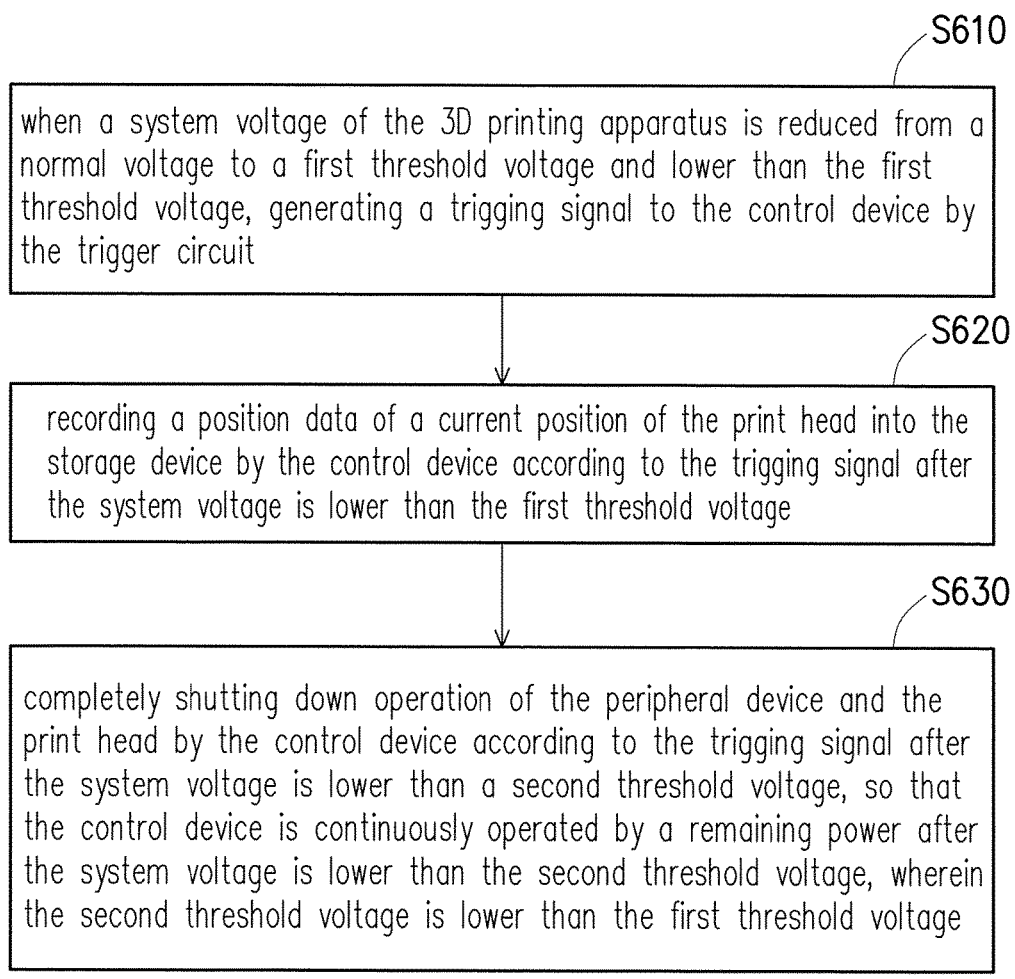
FIG. 6 is a flowchart of a print protection method according to another exemplary embodiment.

FIG. 6 is a flowchart of a print protection method according to another exemplary embodiment. Referring to FIG. 1 and FIG. 6, in the exemplary embodiment, the print protection method is adapted to the 3D printing apparatus 100 in the embodiment of FIG. 1. In step S610, when the system voltage of the 3D printing apparatus 100 is reduced from the normal voltage to the first threshold voltage and lower than the first threshold voltage, the trigger circuit 120 generates the triggering signal to the control device 110. In step S620, the control device 110 records the position data of the current position of the print head 140 into the storage device 150 according to the triggering signal after the system voltage is lower than the first threshold voltage. In step S630, the control device 110 completely shuts down operation of the peripheral device 130 and the print head 140 according to the triggering signal after the system voltage is lower than the second threshold voltage, so that the control device 110 is continuously operated by the remaining power after the system voltage is lower than the second threshold voltage, wherein the second threshold voltage is lower than the first threshold voltage. Therefore, when the sudden-power-off is occurred on the 3D printing apparatus 100, the control device 110 can shut down the operation of all peripheral devices so that the control device can be operated continuously according to sufficient remaining power and accurately record the final position of the print head 140 in advance, such that the 3D printing apparatus 100 can continue the previous printing operation accurately after the power supply is restored.

In addition, sufficient teaching, suggestions and implementation regarding implementation details and related device feature regarding the 3D printing apparatus 100 in the exemplary embodiment can be derived from the embodiments of FIG. 1 to FIG. 5, and thus no further descriptions are incorporated herein.

According to the above exemplary embodiments, the print protection method and the 3D printing apparatus are capable of determining whether power-off is occurred on the 3D printing apparatus via the trigger circuit, and shutting down the operation of all peripheral devices so that the control device can be operated continuously by sufficient remaining power, and accurately record the final position of the print head after the power is off, such that the 3D printing apparatus can accurately continue the previous printing operation after the power supply is restored. Moreover, the 3D printing apparatus in the invention is also capable of shutting down related internal circuit that consumes more energy in the 3D printing apparatus according to the triggering signal provided by the trigger circuit to reduce the attenuation of the remaining power for the 3D printing apparatus. Therefore, the 3D printing apparatus of the invention can have sufficient time to record the final position of the print head after the power is off. In addition, the 3D printing apparatus of the invention may further move the print head out of the printing range after the power is off, or operate the print head to perform wire withdrawing operation to effectively protect the 3D object and reduce printing discrepancy.

It will be apparent to those skilled in the art that various modifications and variations can be made to the structure of the exemplary embodiments without departing from the scope or spirit thereof. In view of the foregoing, it is intended that the exemplary embodiments cover modifications and variations of the exemplary embodiments provided they fall within the scope of the following claims and their equivalents.

What is claimed is:

1. A print protection method, adapted to a three-dimensional printing apparatus, and the three-dimensional printing apparatus comprising a trigger circuit, a control device, a peripheral device, a print head and a storage device, the method comprising:
   when a system voltage of the three-dimensional printing apparatus is reduced from a normal voltage to a first threshold voltage and lower than the first threshold voltage, generating a triggering signal to the control device by the trigger circuit;
   recording a position data of a current position of the print head into the storage device by the control device according to the triggering signal after the system voltage is lower than the first threshold voltage; and
   completely shutting down operation of the peripheral device and the print head by the control device according to the triggering signal after the system voltage is lower than a second threshold voltage, so that the control device is continuously operated by a remaining power after the system voltage is lower than the second threshold voltage, wherein the second threshold voltage is lower than the first threshold voltage.

2. The print protection method as claimed in claim 1, wherein in a time period during which the system voltage is reduced from the first threshold voltage to the second threshold voltage, the control device shuts down the peripheral device but does not completely shut down the print head.

3. The print protection method as claimed in claim 1, wherein the step of recording the position data of the current position of the print head into the storage device by the control device according to the triggering signal after the system voltage is lower than the first threshold voltage comprises:
  determining whether the position data recorded in the storage device corresponds to the current position of the print head by the control devices to confirm whether the position data recorded in the storage device corresponds to a final position of the print head; and
  if the position data does not correspond to the current position of the print head, re-recording the position data of the current position of the print head into the storage device by the control device.

4. The print protection method as claimed in claim 3, wherein the control device completes recording the final position of the print head when the system voltage begins to be lower than the first threshold voltage and in a time period during which an operation voltage of the storage device is reduced from a first voltage to a second voltage.

5. The print protection method as claimed in claim 4, further comprising:
  if the remaining power is sufficient, driving the print head to move out of the printing range by the control device; and
  if the remaining power is insufficient, driving the print head to perform a wire withdrawing operation by the control device.

6. The print protection method as claimed in claim 1, further comprising:
  in a time period during which the system voltage is reduced from the first threshold voltage to the second threshold voltage, shutting down a feeding operation of the print head by the control device, and calculating a remaining power of the three-dimensional printing apparatus and a shortest path along which the print head is moved away from a printing range; and
  determining, according to the remaining power and the shortest path, whether a time period during which the system voltage is reduced from the first threshold voltage to the second threshold voltage is sufficient to drive the print head to move out of a printing range by the control device.

7. The print protection method as claimed in claim 1, further comprising:
  when power supply for the three-dimensional printing apparatus is restored, reading the position data stored in the storage device by the control device, and driving the print head according to the position data.

8. The print protection method as claimed in claim 1, wherein the peripheral device comprises at least one of a motor device, a heating device, a fan device and a laser device.

9. A three-dimensional printing apparatus, comprising:
  a control device;
  a trigger circuit, coupled to the control device, wherein when a system voltage is reduced from a normal voltage to a first threshold voltage and lower than the first threshold voltage, the trigger circuit generates a triggering signal to the control device;
  a peripheral device, coupled to the control device;
  a print head, coupled to the control device; and
  a storage device, coupled to the control device,
  wherein the control device records a potion data of a current position of the print head into the storage device according to the triggering signal after the system voltage is lower than the first threshold voltage,
  wherein the control device completely shuts down operation of the peripheral device and the print head according to the triggering signal after the system voltage is reduced to a send threshold voltage, so that the control device is continuously operated by a remaining power after the system voltage is lower than the second threshold voltage, wherein the second threshold voltage is lower than the first threshold voltage.

10. The three-dimensional printing apparatus as claimed in claim 9, wherein in a time period during which the system voltage is reduced from the first threshold voltage to the second threshold voltage, the control device shuts down the peripheral device but does not completely shut down the print head.

11. The three-dimensional printing apparatus as claimed in claim 9, wherein the control device determines whiter the position data recorded in the storage device corresponds to the current position of the print head, if the position data does not correspond to the current position of the print head, the control device re-records the position data of the current position of the print head into the storage device.

12. The three-dimensional printing apparatus as claimed in claim 11, wherein the control device completes recording the final position of the print head when the system voltage begins to be lower than the first threshold voltage and in a time period during which an operation voltage of the storage device is reduced from a first voltage to a second voltage.

13. The three-dimensional printing apparatus as claimed in claim 9, wherein in a time period during which the system voltage is reduced from the first threshold voltage to the second threshold voltage, the control device shuts down a feeding operation of the print head, and calculates a remaining power of the three-dimensional printing apparatus and a shortest path along which the print head is moved away from a printing range, and the control device determines whether a time period during which the system voltage is reduced from the first threshold voltage to the second threshold voltage is sufficient to drive the print head to move out of a printing range according to the remaining power and the shortest path.

14. The three-dimensional printing apparatus as claimed in claim 13, wherein if the remaining power is sufficient, the control device drives the print head to move out of the printing range, wherein if the remaining power is insufficient, the control device drives the print head to perform a wire withdrawing operation.

15. The three-dimensional printing apparatus as claimed in claim 9, wherein when a power supply for the three-dimensional printing apparatus is restored, the control device reads the position data stored in the storage device, and drives the printing head according to the position data.

16. The three-dimensional printing apparatus as claimed in claim 9, wherein the periphery device comprises at least one of a motor device, a heating device, a fan device and a laser device.

* * * * *